United States Patent [19]
Saito et al.

[11] Patent Number: 5,175,654
[45] Date of Patent: Dec. 29, 1992

[54] DISK APPARATUS

[75] Inventors: Takehiko Saito; Junkichi Sugita, both of Kanagawa, Japan

[73] Assignee: Sony Corporation, Tokyo, Japan

[21] Appl. No.: 722,129

[22] Filed: Jun. 27, 1991

[30] Foreign Application Priority Data

Jun. 29, 1990 [JP] Japan .................. 2-173723

[51] Int. Cl.$^5$ .............................................. G11B 5/09
[52] U.S. Cl. ...................................................... 360/51
[58] Field of Search ............................ 360/51, 46, 65; 375/119, 120

[56] References Cited

U.S. PATENT DOCUMENTS 4,894,734  1/1990  Fischler et al. .................. 360/51
4,964,109  10/1990  Yoshioka ......................... 360/51

Primary Examiner—Vincent P. Canney
Attorney, Agent, or Firm—Philip M. Shaw, Jr.

[57] ABSTRACT

A disk apparatus of zone-recording type having a plurality of recording zones is structured such that a plurality of reference clock signals, each corresponding to a recording zone, are generated in both a recording mode and a reproducing mode. A reference frequency signal means, for generating an oscillating signal of a reference frequency, is combined with a variable frequency forming phase locked circuit. A first switch selectively causes the phase locked circuit to perform the phase locking in response to the reference frequency signal generated from the reference signal means or the reproducing signal. A demultiplying means switches a demultiplying ratio according to the mode.

2 Claims, 6 Drawing Sheets

| OPERATIONAL MODE | OPERATIONS | | |
|---|---|---|---|
| | M | N | 51G |
| RETACTING MODE | 4/3 | 3 | — |
| READ MODE | 4/3 | — | OPEN/SHUT |
| WRITE MODE | 4 | 4/3 | — |
| OTHER OPERATION | 4 | 3 | — |

FIG.6

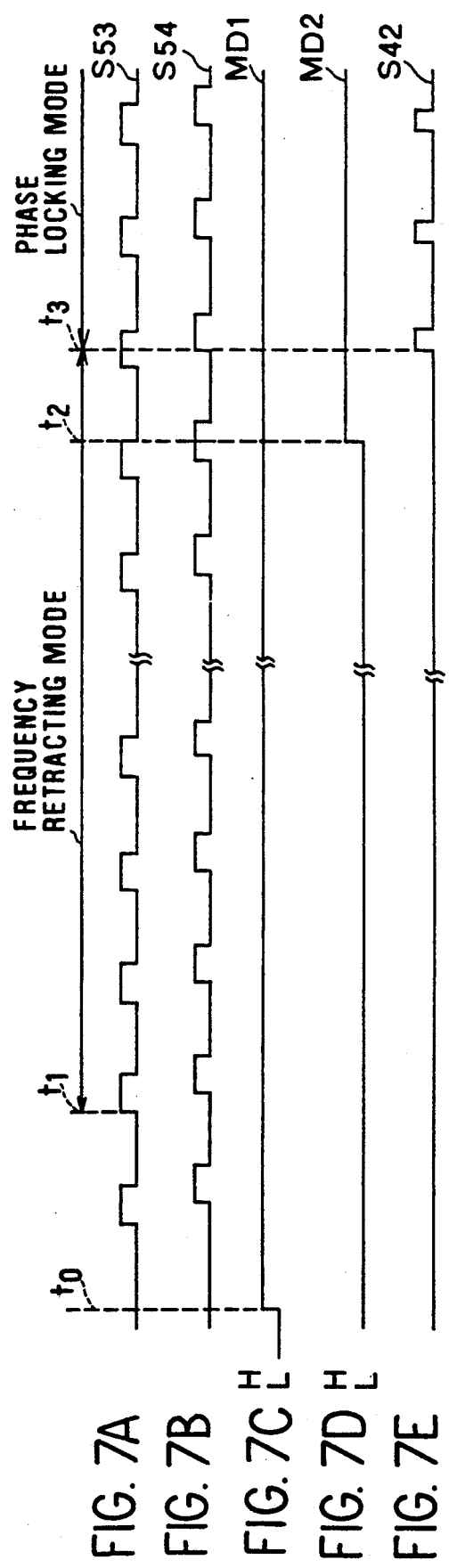

DISK APPARATUS

BACKGROUND OF THE INVENTION

1. Field of the Invention

The present invention relates to a disk apparatus, and, more particularly, to a disk apparatus which is suitable to constitute a zone-recording disk apparatus.

2. Description of the Related Art

As shown in FIG. 1, a conventional zone-recording disk recording/reproducing apparatus includes, as its recording medium, a magnetic disk recording/reproducing 1 which comprises, for example, a hard disk. The magnetic disk 1 has a recording surface which are sectioned into a first recording zone ZN1, which is the outer zone in the radial direction, and a second recording zone ZN2, which are the inner zone in the same direction. Furthermore, the data recording/reproducing speed to and from the first recording zone ZN1 is arranged to be faster than that to and from the second recording zone ZN2. As a result, the recording density in the first recording zone ZN1 can be made to be substantially the same as that in the second recording zone ZN2. Consequently, the overall recording capacity of the magnetic disk 1 can be enlarged.

The magnetic disk 1 is arranged in such a manner that it can be rotated at a speed of a constant angular velocity, causing the liner velocity of the recording tracks included in the first recording zone ZN1 to be faster than that of the recording tracks included in the second recording zone ZN2. Therefore, if the zone recording system is not employed, the recording density in the first recording zone ZN1, which is the outer zone, is lower than that in the second recording zone ZN2, which is the inner zone. In consequence, the poor recording efficiency results.

However, the conventional disk apparatus has been arranged to comprise a synchronizing signal processing circuit 10 constituted as shown in FIG. 2 or 3. Circuit 10 is used in order to obtain a synchronizing signal with which the data processing speed can be controlled when data is recorded/reproduced to and from the first or the second recording zone ZN1 or ZN2, respectively, in the recording mode or the reproducing mode.

The synchronizing signal processing circuit 10 shown in FIG. 2 comprises a first and second crystal oscillation circuits 11 and 12. Frequency signals S11 and S12 of frequencies $f_1$ and $f_2$, which are respectively determined by crystal 11X and crystal 12X, are selectively switched by a switch circuit 13 in response to a zone detection signal S13. The frequency signals S11 and S12 correspond respectively to the data processing speed of the first and second recording zones ZN1 and ZN2. The thus selectively switched frequency signals S11 and S12 are, as reference clock signal S14, transmitted to a data synchronizer 14. As a result, a recording synchronizing clock signal S15, which corresponds either to the first recording zone ZN1 or to the second recording zone ZN2, is transmitted from the data synchronizer 14 in the recording mode.

In the reproducing mode, a reproducing pulse signal S16 transmitted from a reproducing signal processing circuit is received by the data synchronizer 14. A reproducing synchronizing clock signal S17 the frequency of which corresponds to the frequency of the above-described reproducing pulse signal S16 is transmitted from the data synchronizer 14.

In a case where the synchronizing signal processing circuit 10 is structured as shown in FIG. 2, the two crystal oscillating circuits 11 and 12 must be provided as signal generating sources for generating the recording synchronizing clock signal S15 the frequency of which corresponds to the first and the second recording zones ZN1 and ZN2 in the recording mode. Therefore, the structure of the synchronizing signal processing circuit 10 becomes too complicated.

In order to overcome this, the synchronizing signal processing circuit 10 structured as shown in FIG. 3 is arranged in such a manner that the number of the crystal oscillating circuits is reduced to one.

That is, as shown in FIG. 3, where the same elements as those shown in FIG. 2 are given the same reference numerals, the synchronizing signal processing circuit 10 comprises only one crystal oscillating circuit 21. A frequency signal S21, the frequency of which is $f_0$ and which is generated due to the oscillating operation of crystal 21X, is transmitted to a first frequency demultiplying circuit 23 of a synthesizer circuit 22.

The frequency demultiplying circuit 23 demultiplies (i.e. divides) the frequency $f_0$ of the frequency signal S21 at a ratio of 1/K1 before the thus-demultiplied frequency is, as a reference input signal S22, transmitted to a phase comparison circuit 24. In the phase comparison circuit 24, the phase of the reference input signal S22 and the phase of a feedback signal S23 transmitted from a second frequency demultiplying circuit 25 are subjected to a comparison.

An output signal S24, which denotes the result of the phase comparison transmitted from the phase comparison circuit 24, is converted into a DC level voltage signal S25 by a charge pump circuit 26 so as to be supplied to a voltage control type oscillating circuit (VCO) 27.

Thus, a frequency signal having a frequency of $f_{01}$, which corresponds to the DC level voltage signal S25, can be obtained at the output terminal of the voltage control oscillating circuit 27. The thus obtained frequency signal is, as a reference clock signal S26, transmitted to the data synchronizer 14. Furthermore, it is demultiplied by the frequency demultiplying circuit 25 at a frequency demultiplying ratio of 1/K2 so as to be fed back as a feedback signal to the phase comparison circuit 24.

In the structure shown in FIG. 3, the synthesizer circuit 22 serves as a PLL (Phase Locked Loop) circuit. Therefore, when a locked state, in which there is no phase error in the output S24 denoting the result of the phase comparison transmitted from the phase comparison circuit 24, is realized, the frequency $f_0$ of the frequency signal S21 transmitted from the crystal oscillating circuit 21 and the frequency $f_{01}$ of the reference clock signal S26, hold a relationship shown by the following equation in which it is expressed by the demultiplying ratios 1/K1 and 1/K2 of the corresponding frequency demultiplying circuits 23 and 25:

$$\frac{f_0}{K1} = \frac{f_{01}}{K2} \qquad (1)$$

Therefore, the frequency $f_{01}$ of the reference clock signal S26 can be changed by changing the frequency demultiplying ratios 1/K1 and 1/K2 with respect to the frequency $f_0$ as follows:

$$f_{01} = \frac{K2}{K1} f_0 \qquad (2)$$

The frequency demultiplying ratios 1/K1 and 1/K2 of the corresponding frequency demultiplying circuits 23 and 25 of the synthesizer circuit 22 can be changed by a zone detection signal S27 by utilizing the above-described relationship. As a result, the frequency $f_{01}$ of the reference clock signal S26 can be changed to a frequency which corresponds to the data processing speed in the first and the second recording zones ZN1 and ZN2.

In an actual case where the frequency $f_{01}$ of the reference clock signal S26 is made to be 24 MHz when data is recorded to the first recording zone ZN1 and it is desired to be changed to 18 MHz when data is recorded to the second recording zone ZN2, the crystal 21X of an oscillating frequency of 24 MHz is used. As a result, the synthesizer circuit 22 is able to transmit the reference clock signal S26 the frequency $f_{01}$ of which is 24 MHz while basing on the frequency signal S21 ($f_0=24$ MHz) by establishing the frequency-demultiplying numbers K1 and K2 of the corresponding frequency demultiplying circuits 23 and 25 to be K1=4 and K2=4 when the magnetic head is scanning the first recording zone ZN1.

By respectively changing the frequency-demultiplying numbers K1 and K2 of the frequency demultiplying circuits 23 and 25 in such a manner that K1=4 and K2=3 when the magnetic head is scanning the second recording zone ZN2, the synthesizer circuit 22 is able to transmit the reference signal S26 the frequency $f_{01}$ of which is 18 MHz while basing on the frequency signal S21 ($f_0=24$ MHz).

As described above, the synchronizing signal processing circuit 10 shown in FIG. 3 must comprise only one crystal oscillating circuit. Therefore, the structure can be further simplified in comparison to the synchronizing signal processing circuit 10 shown in FIG. 2. However, the synthesizer circuit 22 structured by the PLL circuit is individually provided in front of the data synchronizer 14 also structured by the PLL circuit. Therefore, the overall structure cannot be satisfactorily simplified.

SUMMARY OF THE INVENTION

To this end, an object of the present invention is to provide a disk apparatus structured in such a manner that reference clock signals having frequencies which correspond to a plurality of recording zones are generated in a recording mode and a reproducing mode while significantly simplifying the structure in comparison to a conventional disk apparatus.

In order to achieve the above-described object, according to one aspect of the present invention, there is provided a disk apparatus comprising: a recording disk having a plurality of recording zones for the purpose of recording or reproduced data at a plurality of different data speed levels; reference frequency signal generating means having oscillating means for generating an oscillating frequency signal of a reference frequency and first demultiplying means for demultiplying the oscillating frequency signal at a first demultiplying ratio as a reference frequency signal; first switch means for receiving, as a retracting frequency signal. Further provided are a reproducing pulse signal reproduced from the recording disk in a reproducing mode and receiving, as the retracting frequency signal, the reference frequency signal in a recording mode; phase comparison means for making a comparison between the phase of the retracting frequency signal and that of a feedback frequency signal; controllable oscillating means for generating a variable frequency in response to an error signal obtained from the phase comparison means, the variable frequency being capable of eliminating the error. Second demultiplying means demultiplying the variable frequency signal at a second frequency demultiplying ratio which is switched to correspond to a plurality of the data speed levels in the recording mode and second switch means supply a demultiplied-frequency output from the second demultiplying means to the phase comparison means as the feedback frequency signal in the recording mode or supplying the variable frequency signal to the phase comparison means as the feedback frequency signal without passing through the second demultiplying means in the reproducing mode. In this way a first synchronizing clock signal, which is locked to a reference frequency signal obtained from the reference frequency signal generating means in the recording mode, is transmitted in response to the variable frequency signal or a second synchronizing clock signal, which is locked to a reproducing pulse signal reproduced from the recording disk in the reproducing mode, is transmitted.

According to another aspect of the present invention, the frequency demultiplying ratio of the first demultiplying circuit is switched to a value which corresponds to one recording zone of the plurality of the recording zones from which the reproducing pulse signal is being picked up at present and the demultiplied-frequency output from the first demultiplying means is transmitted as an external reference frequency signal.

The phase comparison means, the controllable oscillating means, the second demultiplying means and the second switch means constitute a phase lock means of a phase locked loop circuit structure. The first switch means selectively causes the phase lock means to perform the phase locking operation in response to the reference frequency signal generated from the reference frequency signal generating means or the reproducing pulse signal.

As a result, the synchronizing information, which is necessary to record data to the recording disk in the recording mode or to reproduce data from the same in the reproducing mode, can be generated while further simplifying the overall structure.

Other and further objects, features and advantages of the invention will be appear more fully from the following description.

BRIEF DESCRIPTION OF THE DRAWINGS

FIG. 6 is a table which illustrates the operation mode of the disk recording/reproducing apparatus according to the invention; and FIG. 7 A through E illustrates signal waveforms used at the above-described operation.

DESCRIPTION OF THE PREFERRED EMBODIMENT

An embodiment of the present invention will now be described with reference to the drawings.

Overall Structure of Disk Apparatus

Figure 4:
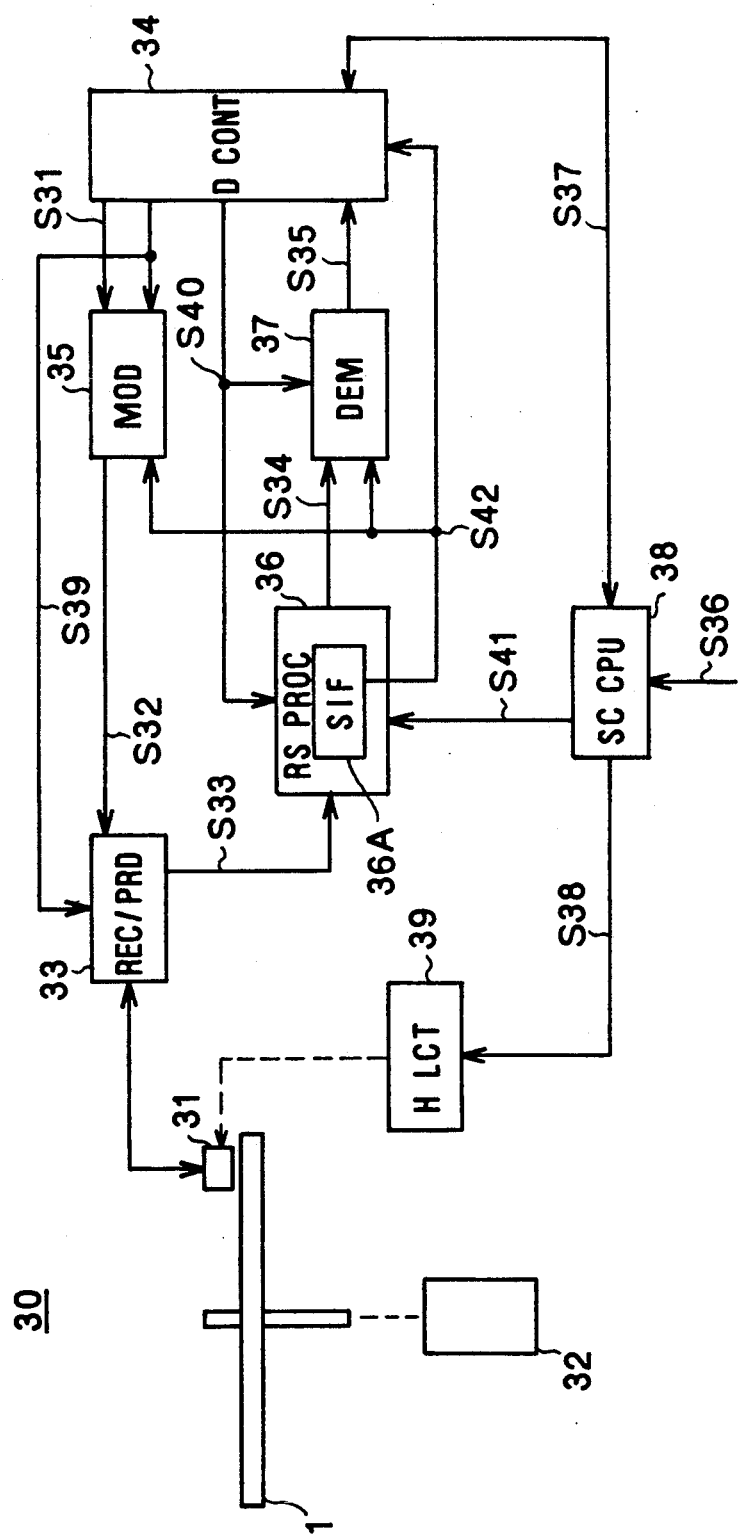
FIG. 4 is a block diagram which illustrates an embodiment of a disk recording/reproducing apparatus according to the present invention.

A disk apparatus 30 is, as shown in FIG. 4, constituted in such a manner that the speed of processing a recording signal and the speed of processing a reproducing signal are switched in accordance with the recording zone which is being scanned by a magnetic head 31.

That is, the magnetic head 31 for scanning a magnetic disk 1, which is rotated by a spindle driving circuit 32 at a predetermined angular velocity, is connected to a recording/reproducing circuit 33. Therefore, write data S32 generated in a modulating circuit 35 in accordance with recording data S31 transmitted from a disk controller 34 in a recording mode is supplied to the magnetic head 31 via the recording/reproducing circuit 33.

On the other hand, read data S33 picked up by the magnetic head 31 in a reproducing mode is supplied from the recording/reproducing circuit 33 to a reproducing signal processing circuit 36. The reproducing signal processing circuit 36 transmits synchronizing data S34 in accordance with the read data S33 to a demodulating circuit 37 so that reproduced data S35 is supplied to the disk controller 34.

The disk apparatus 30 has a CPU (Central Processing Unit) 38 for controlling the system. The CPU 38 transmits/receives a control signal S37 to and from the disk controller 34 when a read/write command S36 is supplied from outside. As a result, the CPU 38 controls the disk controller 34 to perform the recording controlling operation or the reproducing controlling operation.

The system controlling CPU 38 supplies a head movement signal S38 to a head locating circuit 39 when data is recorded/reproduced to and from the magnetic disk 1 by the magnetic head 31. As a result, predetermined data items can be recorded on or reproduced from an instructed recording track included in a first recording zone ZN1 or a second recording zone ZN2.

According to this embodiment, the disk controller 34 transmits a write gate signal S39 to the recording/reproducing circuit 33 and the modulating circuit 35 when it has been brought to the recording mode upon receipt of the control signal S37 is supplied, so that the recording/reproducing circuit 33 and the modulating circuit 35 are brought to the recording state. Furthermore, the disk controller 34 transmits a read gate signal S40 to the reproducing signal processing circuit 36 and the demodulating circuit 37 when it has been brought to the reproducing mode upon receipt of the control signal S37, so that the reproducing signal processing circuit 36 and the demodulating circuit 37 are brought to the reproducing state.

The reproducing signal processing circuit 36 has a synchronizing information forming circuit 36A which forms synchronizing information including a synchronizing clock signal S42 and synchronizing data S34, the synchronizing clock signal S42 having a frequency which corresponds to the first recording zone ZN1 or the second recording zone ZN2 which is being scanned by the magnetic head 31 in response to a zone detection signal S41 supplied from the CPU 38.

The synchronizing information forming circuit 36A supplies the synchronizing clock signal S42 to the disk controller 34, the modulating circuit 35 and the demodulating circuit 37. As a result, the overall structure of the disk apparatus 30 can be operated at the frequency of the above-described synchronizing clock signal S42.

Structure of Synchronizing Information Forming Circuit

Figure 5:
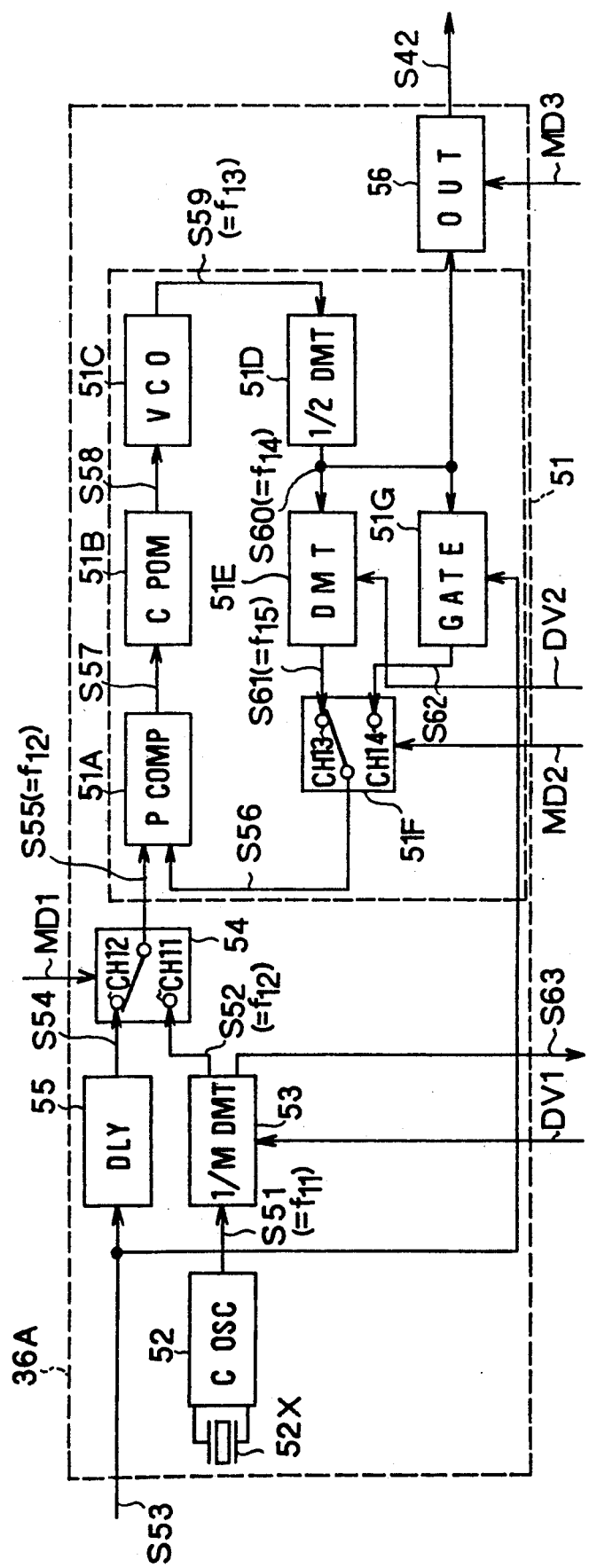
FIG. 5 is a block diagram which illustrates the structure of a synchronizing signal processing circuit of the same.

As shown in FIG. 5, the synchronizing information forming circuit 36A comprises a variable frequency signal forming circuit 51 structured by a PLL circuit. Therefore, in the recording mode, a frequency signal S51, the frequency of which is $f_{11}$ and which is obtained from crystal 52X of a crystal oscillating circuit 52, is demultiplied by a 1/M demultiplying circuit 53. A demultiplied frequency signal S52 is supplied, from the 1/M demultiplying circuit 53, via a switch circuit 54, to a phase comparison circuit 51A as a retracting frequency signal S55. In a reproducing mode, a delay output S54, which is obtained in a delay circuit 55 from the reproducing pulse signal S53 by delaying it by a predetermined delay time, is supplied as a retracting frequency signal S55 via the switch circuit 54.

The variable frequency signal forming circuit 51 subjects the retracting frequency signal S55 to a comparison with a feedback frequency signal S56 in the phase comparison circuit 51A, a phase difference signal S57 denoting the phase difference is supplied to a charge pump circuit 51B. Furthermore, a DC level voltage signal S58 is supplied to a voltage control oscillating circuit (VCO) 51C. As a result, a frequency signal S59, the frequency of which is $f_{13}$ corresponding to the voltage level of the DC level voltage signal S58, is generated.

The above-described frequency signal S59 is demultiplied by a $\frac{1}{2}$ demultiplying circuit 51D to a frequency of $f_{14}$. A demultiplied-frequency output signal S60 is supplied to an output circuit 56 as an output frequency signal.

The demultiplied-frequency output signal S60 is further demultiplied by a 1/N demultiplying circuit 51E so that a demultipled-frequency signal S61, the frequency of which is $f_{15}$ obtained from a demultiplication of 1/N, is obtained. The demultiplied-frequency signal S61 is, via a switch circuit 51F, fed back to the phase comparison circuit 51A as a feedback frequency signal S56.

The demultiplied-frequency output, signal S60 from the $\frac{1}{2}$ demultiplying circuit 51D is also supplied to a gate circuit 51G. A gate output signal S62 transmitted from the gate 51G is, via the switch circuit 51F, fed back to the phase comparison circuit 51A as an alternate feedback frequency signal S56.

Figure 1:
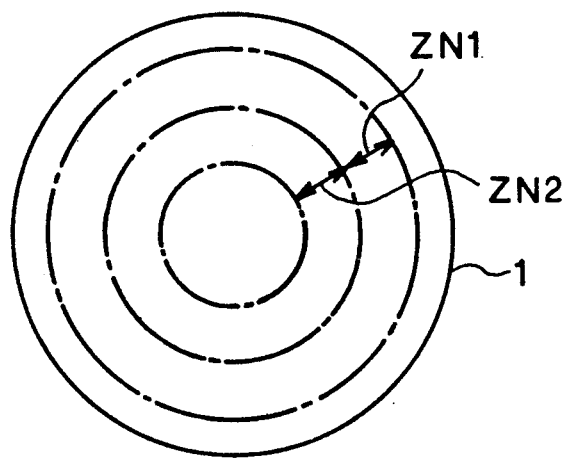
FIG. 1 is a schematic plan view which illustrates a conventional magnetic disk of a zone recording type.
Figure 2:
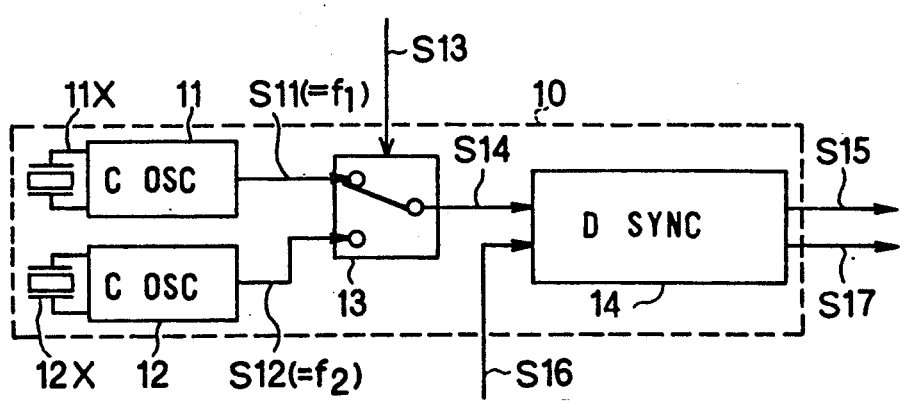
FIGS. 2 and 3 are block diagrams which illustrate conventional synchronizing signal processing circuits.
Figure 3:
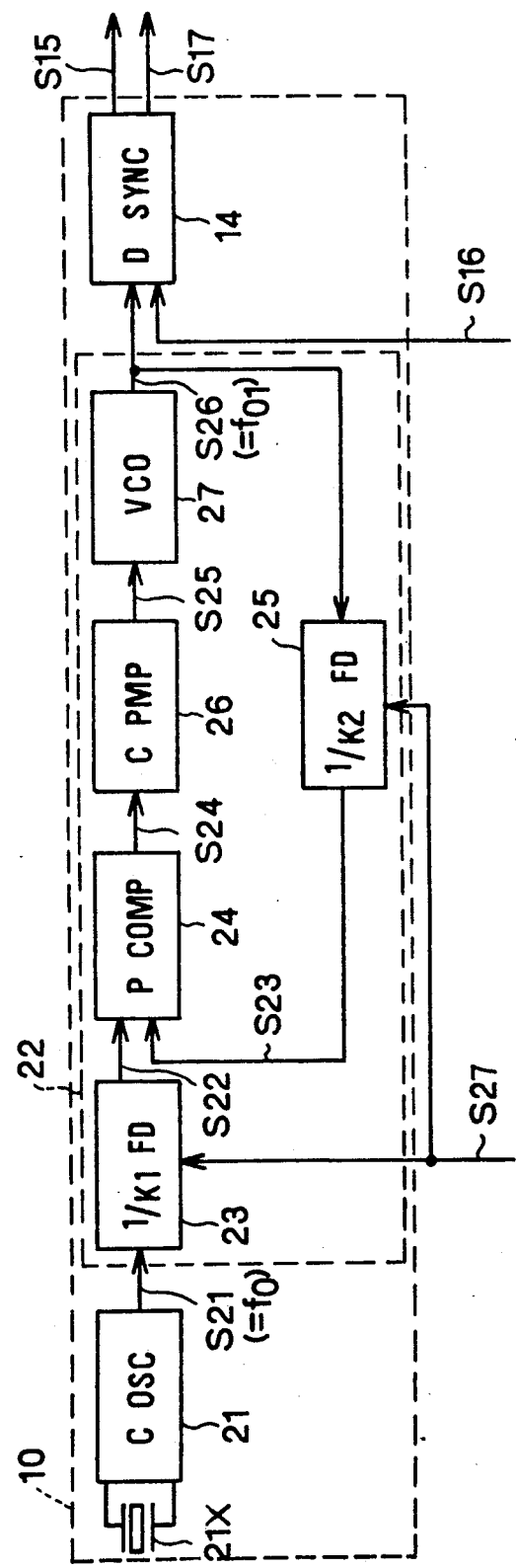

The switch positions of switch circuits 54 and 51F are controlled by externally supplied mode instruction signals MD1 and MD2. As a result, corresponding to the operational mode of the disk apparatus 30 (see FIG. 4), the demultiplied-frequency output from the $\frac{1}{2}$ demultiplying circuit 51D, that is, the frequency of the output frequency signal transmitted from the variable frequency signal forming circuit 51 is made to correspond to the data processing speed in the recording zone ZN1 or ZN2 (see FIG. 1), which is being scanned by the magnetic head 31.

According to this embodiment, the variable frequency signal forming circuit 51, as shown in FIG. 6, possesses four operational modes, that is, a retracting mode, a read mode, a write mode and other mode.

The first operational mode, that is, the retracting mode is a mode in which the variable frequency signal forming circuit 51 is previously retracted to a retracted operational state, which approximates a locked state, in response to a PLL synchronizing signal. The PLL synchronizing signal can be reproduced from the magnetic disk 1 immediately before data is reproduced from the magnetic head 31. When this first operational mode is realized, the switch circuit 54 is switched to a switch input terminal CH12 connected to the delay circuit 55 in response to the mode instruction signal MD1. On the other hand, the switch circuit 51F is switched to a switch input terminal CH13 connected to the 1/N demultiplying circuit 51E in response to the mode instruction signal MD2.

The second operational mode, that is, the read mode is a mode in which reproduced data picked up by the magnetic head 31 is read in the reproducing mode. When this second operational mode is realized, the switch circuit 54 maintains a state where the switch input terminal CH12 connected to the delay circuit 55 is selected in response to the mode instruction signal MD1. On the other hand, the switch circuit 51F selects the switch input terminal CH14 connected to the gate circuit 51G.

The third operational mode, that is, the write mode is a mode in which data is written from the magnetic head 31 to the magnetic disk 1 in the recording mode. At this time, the switch circuit 54 is switched to a switch input terminal CH11 connected to the 1/M demultiplying circuit 53 in response to the mode instruction signal MD1. The switch circuit 51F is switched to the switch input terminal CH13 adjacent to the 1/N demultiplying circuit 51E in response to the mode instruction signal MD2.

The fourth mode is the other operational mode in which the switch circuit 54 is switched to the switch input terminal CH11 in response to the mode instruction signal MD1. Furthermore, the switch circuit 51F is switched to the switch input terminal CH13.

The 1/M demultiplying circuits 53 and the 1/N demultiplying circuit 51E, in response to demultiplying control signals DV1 and DV2, respectively, perform the frequency demultiplying operation to correspond to any one of the first to the fourth operational modes while switching the frequency-demultiplying numbers M and N.

That is, in a first retracting preparation mode, the 1/N demultiplying circuit 51E performs the demultiplying operation at the frequency-demultiplying number N=3 in response to the demultiplying control signal DV2. At this time, the frequency-demultiplying number M of the 1/M demultiplying circuit 53 is switched in response to the demultiplying control signal DV1. The frequency-demultiplying number M is established to be either 3 or 4 depending upon the selected recording zone ZN1 or ZN2 which is scanned by the magnetic head 31. Thus, the demultiplied-frequency output obtainable from the 1/M demultiplying circuit 53 is transmitted as an external reference frequency signal S63.

In the second reading mode, the switch circuits 54 and 51F are respectively switched to the switch input terminals CH12 and CH14, both the 1/M demultiplying circuit 53 and the 1/N demultiplying circuit 51E are brought to a state in which they do not perform effective demultiplying operations.

At this time, the gate circuit 51G is arranged to perform an opening/closing operation at a predetermined timing determined in response to the reproducing pulse signal S53. As a result, the demultiplied-frequency output S60 can be supplied to the switch circuit 51F as the gate output signal S62 at the timing of a predetermined synchronizing data item of the read data S33 picked up by the magnetic head 31.

When the write mode is realized, the 1/M demultiplying circuit 53 is brought to a state in which it performs the demultiplying operation at the frequency-demultiplying number M=4 in response to the demultiplying control signal DV1. Furthermore, the 1/N demultiplying circuit 51E is brought to a state in which it performs, in response to the demultiplying control signal DV2, the demultiplying operation at the frequency-demultiplying number N=4 in the case where data is recorded to the first recording zone ZN1 and at the frequency-demultiplying number N=3 in the case where data is recorded to the second recording zone ZN2.

In this case, when the magnetic head 31 scans the first recording zone ZN1 or the second recording zone ZN2, the frequency of the read data S33 picked up by the magnetic head 31 is made to be the frequency which corresponds to the speed of the processing data recorded in each of the recording zone ZN1 and ZN2.

Also in this operational mode, the frequency-demultiplying number M of the 1/M demultiplying circuit 53 can be switched in response to the demultiplying control signal DV1. As a result, in a state where the magnetic head 31 scans the first recording zone ZN1 or the second recording zone ZN2, the frequency-demultiplying number M is established to be either 3 or 4 corresponding to the first recording zone ZN1 or the second recording zone ZN2. Therefore, the demultiplied-frequency output obtainable from the 1/M demultiplying circuit 53 is, as the external reference frequency signal S63, transmitted.

In the other operational mode, which is the fourth mode, the 1/M demultiplying circuit 53 performs the demultiplying operation at the frequency-demultiplying number M=4 in response to the demultiplying control signal DV1. Furthermore, the 1/N demultiplying circuit 51E performs the demultiplying operation at the frequency-demultiplying number N=3 in response to the demultiplying control signal DV2.

In the above-described first to the fourth operational modes, the output signal S60, which is obtained by the demultiplication of the output signal S59 of the voltage controlled oscillating circuit 51D, causes the synchronizing clock signal S42 to be transmitted to the disk controller 34, the modulating circuit 35 and the demodulating circuit 37 via the output circuit 56, which is controlled by the mode instruction signal MD3, in accordance with the demultiplied-frequency output signal S60.

In the recording mode of the above-described structure, the switch circuit 54 is switched to the 1/M demultiplying circuit 53 in response to the mode instruction signal MD1 and the frequency-demultiplying number 4 is established for the 1/M demultiplying circuit 53 in response to the demultiplying control signal DV1 as detailed above in the description of the write mode and with reference to FIG. 6.

At this time, a frequency oscillation output of a frequency $f_{11}=24$ MHz is obtained as the frequency signal S51 transmitted from the crystal oscillating circuit 52. As a result, the demultiplying frequency signal S52 having the demultiplied frequency $f_{12}=6$ MHz is supplied to the phase comparison circuit 51A via the switch circuit 54 as the retracting frequency signal S55, the demultiplied frequency $f_{12}$ being obtained by quartering the frequency $f_{11}$ in the 1/M demultiplying circuit 53.

On the other hand, the switch circuit 51F is switched, in response to the mode instruction signal MD2, to the 1/N demultiplying circuit 51E. Furthermore, the frequency-demultiplying number N of the 1/N demultiplying circuit 51E is established to be either 4 or 3 to correspond to the selected first recording zone ZN1 or the second recording zone ZN2.

Thus, the variable frequency signal forming circuit 51 is brought to the phase locked state in a state where the frequency-demultiplying number N has been set to 4 by the 1/N demultiplying circuit 51E when data is being recorded to the first recording zone ZN1. As a result, the frequency $f_{14}$ of the demultiplied-frequency output signal S60 is made to be 24 MHz so as to be transmitted as the synchronizing clock signal S42.

On the contrary, when the variable frequency signal forming circuit 51 has been brought to the phase locked state in a state where the frequency-demultiplying number N of the 1/N demultiplying circuit 51E has been established to be 3, the frequency $f_{14}$ of the demultiplied-frequency output signal S60 is made to be 18 MHz so as to be transmitted as the synchronizing clock signal S42.

Thus, the modulating circuit 35 (see FIG. 4) is able to record the write data S32, which has been formed at a data processing speed which corresponds to the frequency of 24 MHz of the synchronizing clock signal S42, to the first recording zone ZN1 when the recording data S31 is recorded to the first recording zone ZN1. When data is recorded to the second recording zone ZN2, the synchronizing clock signal S42 of the frequency of 18 MHz is given. Therefore, the write data S32, which has been processed at the speed which corresponds to this frequency, can be recorded to the second recording zone ZN2.

Then, the reproducing mode is realize. The switch circuit 54 is switched to the switch input terminal CH11 in response to the mode instruction signal MD1 (see FIG. 7C) at time $t_0$ shown in FIG. 4.

In the period before the time $t_0$, the other operational mode (which is neither the recording mode nor the reproducing mode) (see FIG. 6) is realized. In this state, the mode instruction signals MD1 and MD2 (see FIGS. 7C and 7D) are at a logical level of "L". Therefore, the switch circuits 54 and 51F have been switched to the 1/M demultiplying circuit 53 and the 1/N demultiplying circuit 51E. Furthermore, the frequency-demultiplying number M of the 1/M demultiplying circuit 53 has been established to be 4. In addition the frequency-demultiplying number N of the 1/N demultiplying circuit 51E has been established to be 3.

Therefore, a state is realized in which the demultiplying frequency signal S52, the frequency $f_{12}$ of which is 6 MHz, is being supplied from the switch circuit 54 to the phase comparison circuit 51A in response to the frequency signal S51 obtained from the crystal oscillating circuit 52. As a result, the variable frequency signal forming circuit 51 has been brought to a state in which it is performing the PLL operation in a state where its phase has been locked to the demultiplying frequency signal S52. Therefore, a state is realized in which the frequency signal S59 of the voltage control type oscillating circuit 51C, that is, the phase of the demultiplied-frequency output signal S60 has been locked to the phase of the demultiplying frequency signal S52.

When the reproducing mode is realized in this state, the switch circuit 54 is switched to the switch input terminal CH12 connected to the delay circuit 55 because the logical level of the mode instruction signal MD1 (see FIG. 7C) is switched from level "L" to level "H" at time $t_0$. As a result, the switch circuit 54 is switched to the switch input terminal CH12. Therefore, the phase comparison circuit 51A and the charge pump 51B perform the retracting operation in such a manner that the phase difference between the delay output S54 (see FIG. 7B), which has been obtained by delaying the phase of the reproducing pulse signal S53 (see FIG. 7A) by an angular degree of 90 and the feedback frequency signal S56 is eliminated.

As described above in reference to the retracting mode, the frequency-demultiplying number N of the 1/N demultiplying circuit 51E has been established to be 3 in this state. Therefore, the phase comparison circuit 51 performs the phase retracting operation in such a manner that the phase of the feedback frequency signal S56, which has been obtained by demultiplying the frequency $f_{13}$ of the frequency signal S59 by 6, is made to coincide with the phase of the retracting frequency signal S55.

This phase retracting operation is performed in such a manner that the CPU 38 counts the quantity of data reproduced by the magnetic head 31 after the logical level of the mode instruction signal MD1 (see FIG. 7C) has been raised to a high level at time $t_0$. As a result, the logical level of the mode instruction signal MD2 (see FIG. 7D) is raised from the low level to the high level, causing the switch circuit 51F to be switched to the switch input terminal CH14.

Therefore, the variable frequency signal forming circuit 51 feeds back the demultiplied-frequency output signal S60 of the ½ demultiplying circuit 51D of the phase comparison circuit 51A as the feedback frequency signal S56 by sequentially connecting the gate circuit 51G and the switch input terminal CH14 of the switch circuit 51F.

On the other hand, since the mode instruction signal MD1 (see FIG. 7C) is maintained at the high level at time $t_2$, the delay output S54 (see FIG. 7B) of the reproducing pulse signal S53 is, as the retracting frequency signal S55, supplied to the phase comparison circuit 51A via the switch input terminal CH12 of the switch circuit 54.

Therefore, as described for the read mode is with reference to FIG. 6, the demultiplied-frequency output signal S60, the phase of which is locked to the phase of the delay output signal S54 in response to the opening/closing operation performed by the gate circuit 51G, can be obtained in the variable frequency signal forming circuit 51 regardless of the demultiplying operation of each of the 1/M demultiplying circuit 53 and the 1/N demultiplying circuit 51E.

As a result, in the reading mode, the variable frequency signal forming circuit 51 transmits the demultiplied-frequency output signal S60 of the ½ demultiplying circuit 51D from the output circuit 56 as the synchronizing clock signal S42.

In the reproducing mode, the data transmission speed of the reproducing pulse signal S53, which can be picked up from each of the recording zones, becomes the speed which corresponds to the recording density to and from each of the recording zones in a case where the magnetic head 31 is scanning the first recording zone ZN1 or the second recording zone ZN2. The variable frequency signal forming circuit 51 follows the data transmission speed of the above-described reproducing pulse signal S53.

In the above-described retracting mode and the reading mode, the switch circuit 54 has been switched to the delay circuit 55. Therefore, a state is realized in that the demultiplying frequency signal S52 obtained from the 1/M demultiplying circuit 53 is not supplied to the variable frequency signal forming circuit 51. However, the external reference frequency signal S63 is, as the demultiplied-frequency output, the frequency of which is switched in accordance with the selected recording zone ZN1 or ZN2 which is being scanned by the magnetic head 31, transmitted from the 1/M demultiplying circuit 53 so as to be used as the reference synchronizing signal for the disk apparatus 30.

As described above, the synchronizing information forming circuit 36A is constituted in such a manner that it is able to generate, from one crystal oscillating circuit 52, the synchronizing information necessary to reproduce data items having different processing speed levels.

According to the above-described structure, a synchronizing signal processing circuit of a type capable of varying the synchronizing information such as the synchronizing clock signal by combining one crystal oscillating circuit and PLL circuit can be obtained, the synchronizing information being necessary when data items are written or read from a plurality of recording zones ZN1 and ZN2.

Although the description is made according to the above-described embodiment about the structure in which the frequency-demultiplying numbers M and N of the corresponding 1/M demultiplying circuit 53 and the 1/N demultiplying circuit 51E can be changed to 4 or 3, the frequency-demultiplying numbers are not limited to the above-described case. They can be varied to correspond to the oscillating frequency of the crystal oscillating circuit 52 and the speed of reading/writing data to and from the magnetic disk 1.

Furthermore, although two recording zones, ZN1 and ZN2 are provided on the magnetic disk according to the above-described embodiment, the present invention is not limited to this, and it can be widely applied to a case where a plurality of recording zones are provided.

Although the description is made about a structure in which the present invention is applied to a magnetic disk apparatus, the present invention can be widely applied to other disk apparatuses.

As described above, according to the present invention, a disk apparatus capable of easily generating synchronizing information of frequencies necessary for a plurality of modes can be easily realized while simplifying the structure such that only one crystal oscillating circuit and PLL circuit are used.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. A disk apparatus comprising:
   a recording disk having a plurality of recording zones for the purpose of recording and reproducing data at a plurality of different data speed levels;
   reference frequency signal generating means including oscillating means for generating an oscillating frequency signal of a reference frequency and first demultiplying means for demultiplying said oscillating frequency signal at a first demultiplying ratio as a reference frequency signal;
   first switch means for receiving, as a retracting frequency signal, a reproducing pulse signal reproduced from said recording disk in a reproducing mode and receiving, as said retracting frequency signal, said reference frequency signal in a recording mode;
   phase comparison means for making a comparison between the phase of said retracting frequency signal and that of a feedback frequency signal;
   controllable oscillating means for generating a variable frequency in response to an error signal obtained from said phase comparison means, said variable frequency being capable of eliminating said error;
   second demultiplying means for demultiplying said variable frequency signal at a second frequency demultiplying ratio which is switched to correspond to a plurality of said data speed levels in said recording mode; and
   second switch means for supplying either a demultiplied-frequency output from said second demultiplying means to said phase comparison means as said feedback frequency signal in said recording mode or supplying said variable frequency signal to said phase comparison means as said feedback frequency signal without passing through said second demultiplying means in said reproducing mode, whereby a first synchronizing clock signal, which is locked to a reference frequency signal obtained from said reference frequency generating means in said recording mode, is transmitted in response to said variable frequency signal or a second synchronizing clock signal, which is locked to a reproducing signal reproduced from said recording disk in said reproducing mode, is transmitted.

2. A disk apparatus according to claim 1, wherein said frequency demultiplying ratio of said first demultiplying circuit is switched to a value which corresponds to a recording zone of a plurality of said recording zones from which said reproducing pulse signal is being picked up at present and said demultiplied-frequency output from said first demultiplying means is transmitted as an external reference frequency signal.

* * * * *